United States Patent [19]
Adkins et al.

[11] Patent Number: 6,127,463
[45] Date of Patent: Oct. 3, 2000

[54] POLYMERIC MDI COLOR REDUCTION

[75] Inventors: Rick L. Adkins; Clarence D. Blue, both of New Martinsville, W. Va.

[73] Assignee: Bayer Corporation, Pittsburgh, Pa.

[21] Appl. No.: 09/274,405

[22] Filed: Mar. 23, 1999

[51] Int. Cl.$^7$ ................ C08J 3/00; C08K 5/15; C08L 75/00; C07C 249/00; C07C 251/00
[52] U.S. Cl. .................. 524/114; 524/589; 524/590; 528/44; 528/48; 528/73; 560/331; 560/336; 560/340
[58] Field of Search ................ 524/114, 590, 524/589, 48, 73; 528/44; 560/331, 336, 340

[56] References Cited

U.S. PATENT DOCUMENTS

| | | | |
|---|---|---|---|
| 2,885,420 | 5/1959 | Spiegler | 260/453 |
| 3,793,362 | 2/1974 | Kolakowski | 260/453 SP |
| 3,919,166 | 11/1975 | Brachman | 260/45.8 A |
| 3,925,437 | 12/1975 | Rowton | 260/453 AM |
| 4,677,154 | 6/1987 | Narayan et al. | 524/710 |
| 4,775,558 | 10/1988 | Haas et al. | 427/373 |
| 4,814,103 | 3/1989 | Potter et al. | 252/182.22 |
| 4,904,704 | 2/1990 | Nafziger et al. | 521/156 |
| 5,208,368 | 5/1993 | Scherzer et al. | 560/333 |
| 5,312,971 | 5/1994 | Adkins et al. | 560/347 |
| 5,342,881 | 8/1994 | Müller et al. | 524/700 |
| 5,583,251 | 12/1996 | Buysch et al. | 560/347 |
| 5,726,240 | 3/1998 | Rosthauser et al. | 524/590 |

FOREIGN PATENT DOCUMENTS

| | | |
|---|---|---|
| 915846 | 11/1972 | Canada . |
| 1465014 | 2/1977 | United Kingdom . |

*Primary Examiner*—Patrick D. Niland
*Attorney, Agent, or Firm*—Joseph C. Gil; N. Denise Brown

[57] ABSTRACT

The present invention relates to an improved process for the production of light colored polymethylene polyphenyl polyisocyanates. This process comprises adding a compound that contains an epoxide group to the process at any point prior to quench cooling the formed polyisocyanates.

12 Claims, No Drawings

POLYMERIC MDI COLOR REDUCTION

BACKGROUND OF THE INVENTION

This invention relates to an improved process for the production of polymeric MDI, i.e., polymethylene poly (phenyl isocyanates, in which the color of the resultant product is improved by the addition of an epoxide compound during the production process.

Various blends of isocyanates are known in the field of polyurethane chemistry. A component may be blended with an isocyanate to improve a particular characteristic such as, for example, the tendency to discolor. Organic isocyanates are known to discolor over time. These are, in general, colorless liquids or solids and change from light yellow to brown after as little as a few hours. Different stabilizer packages to prevent discoloration of various isocyanates, including toluene diisocyanates and diphenylmethane diisocyanates and prepolymers thereof, are known.

There are several references in which additives are used to prevent the discoloration of monomeric isocyanates, see for example, U.S. Pat. Nos. 2,885,420, 4,677,154 and 4,814,103, as well as in GB 1,465,014. All of these require that the isocyanate be obtained in a colorless or near colorless state, thereby allowing the color inhibitor to be most effective. Once an isocyanate becomes dark, these same additives do not further inhibit or reduce color formation (see, for example, DE 1,793,484). This is especially true of crude MDI (i.e., polymeric MDI), which is inherently dark and extremely difficult to reduce by treatment of the finished isocyanate. In fact, U.S. Pat. No. 5,208,368 discloses that a major disadvantage of the PMDI process is that "this discoloration can only be reduced to an inadequate extent, if at all, even by subsequent phosgenation to prepare the corresponding crude MDI, and that the crude MDI formed cannot be purified by distillation". In other words, once the color forms, it is extremely difficult to reduce it or to remove it.

Two references disclose that the color of PMDI has been reduced by treating the finished PMDI. These are U.S. Pat. Nos. 5,312,971 and 5,583,251. Both of these references describe treating PMDI under strong reducing conditions. In U.S. Pat. No. 5,583,251, PMDI is treated with hydrogen at high temperatures (200° C.) in the presence of a hydrogenation catalyst to obtain color reductions of up to 50% for the absorbance at 430 nm and up to 77% for the absorbance at 520 nm. In U.S. Pat. No. 5,312,971, PMDI treated with a strong chemical reducing agent (i.e., borane: tetrahydrofuran complex) gave mixed results. The 430 nm absorbance decreased by 21% but the 520 nm absorbance increased by 27%.

U.S. Pat. No. 2,885,420 describes stabilizing agents which can be added to organic monomeric isocyanates which have been distilled in quantities of from 0.01% to 0.5% by weight to prevent discoloration of the isocyanates. These stabilizing agents are essentially colorless compounds of the following group: aliphatic, aromatic and cycloaliphatic ethers and thioethers and mixtures of this group of compounds. These compounds are essentially non-reactive with organic isocyanates under ordinary atmospheric conditions and/or react slowly in the absence of a catalyst. This group of compounds stabilizes the organic monomeric isocyanates against discoloration, even in the presence of oxygen, moisture or light.

U.S. Pat. No. 4,677,154 describes a stabilizer package comprising 2,6-di(t-butyl)-p-cresol (BHT) and a second compound may be added to a thermoplastic polyurethane reaction mixture in quantities of from 0.01 to 1% by weight, based on the weight of the isocyanate, to eliminate discoloration in the resultant polyurethane. The second compound of the stabilizer package is selected from various phosphite, diphosphonites, substituted phenols, etc. The reaction mixture also comprises 4,4'-methylene diphenyl diisocyanate, a polyol selected from the group consisting of polyester polyols and polyoxyalkylene polyether polyols, and a short chain extender. This stabilizer package is suitable for use to prevent discoloration of polyurethanes based on various isocyanates including aliphatic, cycloaliphatic, arylaliphatic and aromatic isocyanates, including polymeric polyisocyanates such as polymethylene poly(phenylene polyisocyanate).

Similarly, U.S. Pat. No. 4,814,103 describes the use of a hindered phenol, such as, for example, BHT and aliphatic epoxides to prevent discoloration of prepolymers based on monomeric MDI, especially MDI with a high 2,4'-monomer content. The hindered phenols must be added to the 2,4-rich MDI immediately after distillation, while the epoxide can be added then or later along with the co-reactants for preparing the prepolymer.

A process for improving the storage stability of diphenylmethane diisocyanates is also described in GB 1,465,014. This process comprises storing refined diphenylmethane diisocyanate in intimate admixture with glycidol. Suitable diphenylmethane diisocyanates include the 2,2'-isomer, the 2,4'-isomer and the 4,4'-isomer, and mixtures thereof. It is also possible that trace quantities of related triisocyanates such as, for example, 2,4'-di-(p-isocyanobenzyl)phenyl isocyanate as well as other impurities such as ureas, carbodiimides, uretonimines, etc. are present in minimal amounts. The quantity of glycidol is typically from 0.001 to 0.25% by weight of the isocyanate. It is also possible that glycidol be used in combination with an organic solvent such as, for example, toluene, dimethyl phthalate, acetone, etc. The isocyanate can be dissolved in the solvent, the glycidol added to that solution and the solvent removed, or the glycidol can be added to the diisocyanate as a solution in a small amount of an inert solvent.

All of these patents are directed to stabilization of polyurethane compounds against discoloration. Most polymeric MDI mixtures are highly colored when they are manufactured. In fact, many of these products are residues and thus, the reproducibility and standardization of these polymeric MDI blends is cumbersome.

Fire-retardant polyurethanes and polyurea-urethanes having improved processability and color stability are disclosed by U.S. Pat. No. 3,919,166. These comprise the reaction product of an organic compound having active hydrogen-containing groups that are reactive with isocyanate groups, an organic polyisocyanate, and 2,3-dibromo-2-butenediol-1,4 and, optionally, a long chain α-olefin epoxide. In another embodiment, the long chain α-olefin epoxide can be melt-blended in after the product is formed. It is preferred that the epoxide is added to partially polymerized polyurethane no sooner than about the last fourth of the reaction sequence. These polyurethane compositions are described as having improved stability against deterioration resulting from exposure to heat or to sunlight or ultraviolet light. The addition of the epoxide to the reaction mixture effectively inhibits discoloration and facilitates processing of the polyurethanes.

Epoxides are also disclosed as effective stabilizers against thermolysis and contact discoloration in polyurethane-forming mixtures by U.S. Pat. No. 4,775,558. These polyurethane-forming mixtures comprise an organic polyisocyanate, a high molecular weight isocyanate reactive material, a catalyst and an epoxide as a stabilizer. Suitable epoxides have equivalent weights of between 57 and 10,000, and are used in amounts of 0.01 to 50 parts by weight, based on 100 parts by weight of polyether polyol.

A method of treating toluene diisocyanate distillation residues is disclosed by U.S. Pat. No. 4,904,704. This method comprises treating the residues with at least about 0.5 equivalents, based on hydrolyzable chloride concentration of the residues, of an epoxy compound at a temperature of from about 155 to 220° C. This results in a treated distillation residue having a hydrolyzable chloride level of less than about 800 ppm. These TDI distillation residues are useful for producing rigid foams.

A process for the standardization and stabilization with simultaneous increase of reactivity of organic polyisocyanates is described by U.S. Pat. No. 5,342,881. This process comprises mixing an organic polyisocyanate at 20 to 150° C. with a) 0.01 to 10% by weight, based on the polyisocyanate, of an organic compound corresponding to a specified formula which contains at least one epoxide group, and b) 0.01 to 1% by weight, based on the polyisocyanate, of a silylated acid corresponding to the specified formula therein.

U.S. Pat. No. 5,208,368 discloses the preparation of mixtures of diphenylmethane diisocyanates and polyphenylpolymethylene polyisocyanates of reduced iodine color number. This process for the preparation of crude MDI of reduced iodine color number by reacting the corresponding crude MDA with phosgene in the presence of at least one inert organic solvent at elevated temperature, removing excess phosgene and solvent when the phosgenation is complete, and heating the reaction product which comprises incorporating monohydric or polyhydric polyoxyalkylene alcohols in an effective amount into the reaction mixture when the phosgenation is complete. This addition of monohydric and/or polyhydric polyoxyalkylene alcohols can substantially reduce the iodine color number of crude MDI, for example, to values of less than 60, preferably of from 35 to less than 20.

U.S. Pat. Nos. 3,793,362 and 3,925,437 relate to methods of reducing the acidic impurities in organic polymeric isocyanates. U.S. Pat. No. 3,793,362 describes a process to reduce the acid content and hydrolyzable chlorine content by mixing polymethylene poly(phenylisocyante), PMDI, with from about 0.25 to 1.0 epoxy equivalents of a monomeric epoxide compound, for each equivalent of acid present in the PMDI. Suitable monomeric epoxide compounds contain at least one epoxy group present in a substituent attached to an aliphatic, cycloaliphatic or aromatic hydrocarbon, or have two terminal epoxy groups separated by the residue of a polyoxyalkylene glycol having a molecular weight of from about 100 to 700.

It is disclosed by U.S. Pat. No. 3,925,437 that the acidity of methylene-bridged polyphenyl polyisocyanate mixtures can be reduced by mixing the isocyanate mixture with a lower alkylene oxide compound that contains from 2 to 4 carbon atoms per molecule. In this process, the mixing may occur at ambient temperatures or in the presence of heat.

DE 1,793,484 also discloses that the addition of epoxides to polymeric MDI stabilizes the reactivity of the polymeric MDI by reducing the acidity. Epoxides are added to the polymeric MDI in amounts of from 0.15 to 3% by weight, based on the weight of polymeric MDI. This reference also states that color stabilization of colorless isocyanates can be attained by addition of epoxides. Epichlorohydrin, styrene oxide, bisphenol A diglycidyl ether, and N,N-(diepoxypropyl)aniline are disclosed as suitable epoxides. However, the addition of epoxides to dark colored isocyanates, such as, for example, polymethylene poly (phenylisocyanate (i.e., PMDI), does not reduce the color of these isocyanates.

Mixtures of various groups of epoxides and polymethylene poly(phenylisocyanate) blends is disclosed by U.S. Pat. No. 5,726,240. The addition of these epoxides is disclosed as stabilizing the reactivity of the polyisocyanate blends such that it is no longer dependent on the acidity of the polyisocyanate blend. This reference broadly discloses that suitable mixtures comprise a) 90 to 99.5% by weight of polymethylene poly(phenylisocyante) blends, and b) 0.5 to 10% by weight of epoxides having an epoxide equivalent weight of about 44 to 400.

Copending application Ser. No. 09/207,340 filed in the United States Patent and Trademark Office on Dec. 8, 1998, which is commonly assigned to Bayer Corporation relates to a novel process for the reduction of color in polymethylene poly(phenyl isocyanates). This process comprises mixing a) from 0.001 to 3% by weight, of a epoxide having an equivalent weight from about 44 to about 700, and b) a refined polymethylene poly(phenylisocyanate). Refined is defined as polymethylene poly(phenylisocyanate) in which substantially all phosgene and solvent have been removed.

According to the present invention, from 0.001 to 10% by weight of an epoxide having an equivalent weight from about 44 to about 700 is added to a polymethylene poly (phenylisocyanate) process at any point prior to solvent removal. This process has the advantage that, by the time the refined PMDI is obtained, no further reaction time is needed. The color reduction has already occurred. In addition, the color reduction resulting from the presently claimed invention is greater than simply adding epoxides to the refined PMDI as in the commonly assigned copending application Ser. No. 09/207,340 filed on Dec. 8, 1998.

SUMMARY OF THE INVENTION

This invention relates to an improved process for the production of polymethylene poly(phenylisocyanates) wherein the resultant isocyanates are characterized by improved color. This process comprises:

(1) condensing (a) formaldehyde with (b) aniline or other primary aromatic amines, to yield the methylene-bridged polyphenyl polyamines, (2) reacting (c) the methylene-bridged polyphenyl polyamines with (d) an excess of phosgene, in the presence of a solvent and elevated temperatures to yield the corresponding methylene-bridged polyphenyl polyisocyanates, (3) removing the solvent from the methylene-bridged polyphenyl polyisocyanates, (4) heating the crude polyisocyanate, preferably at temperatures of at least 100° C., under vacuum to remove residual solvent and reduce by-products, and (5) quench cooling the polyisocyanate to a temperature of less than 80° C., wherein (e) from about 0.001 to about 10% by weight, based on the weight of the isocyanate component, of an epoxide is added to the process prior to step (5), thereby producing methylene-bridged polyphenyl polyisocyanates characterized by improved color.

Suitable epoxides for the present invention include those selected from the group consisting of (i) epoxidized hydrocarbons, (ii) epoxidized ethers, (iii) epoxidized fatty acid monoglycerides, (iv) epoxidized fatty acid diglycerides, (v) epoxidized fatty acid triglycerides, (vi) epoxidized dimer fatty acids, (vii) epoxidized trimer fatty acids, and (viii) mixtures thereof.

As used herein, the phrase improved color refers to the color of treated, refined isocyanates as measured by a UV-visible spectrophotometer at 430 nm and 520 nm. A decrease at either of these 2 absorbances in the treated, refined isocyanates in comparison to the absorbances of the untreated, refined isocyanates constitutes a color improvement.

DETAILED DESCRIPTION OF THE INVENTION

Polymethylene polyphenyl polyisocyanates are prepared commercially by phosgenation of the corresponding polyamines. These polyamines are prepared by condensation of formaldehyde and aromatic amines, especially aniline or substituted anilines, generally in the presence of an acid catalyst; see, for example, U.S. Pat. Nos. 2,680,730, 2,950,263, 3,012,008, 3,097,191, and 3,260,751, the disclosures of which are herein incorporated by reference. The phosgenation is normally carried out in the presence of an inert organic solvent such as chlorobenzene, dichlorobenzene, and the like, preferably at temperatures ranging from 60 to 135° C. When the phosgenation has been completed, the excess phosgene is removed together with the inert organic solvent. Initially the phosgene which is present as vapor is vented from the reaction mixture, together with any hydrogen chloride which has been formed. The bulk of the phosgene is removed by distillation using various types of stripping vessels. The stripping is carried out at atmospheric pressure, or above or below atmospheric pressure, and the phosgene is readily separated from the solution of the polyisocyanate in the inert solvent, preferably at temperatures of from 60 to 145° C. Subsequently, the inert solvent is itself stripped using distillation, preferably under pressure and temperatures conditions of from 760 mm Hg to 1 mm Hg pressure and 60 to 225° C., leaving the polyisocyanate as the final product. Advantageously, a part of the solvent is removed under pressure as described in U.S. Pat. No. 3,912,600, the disclosure of which is herein incorporated by reference.

The process of the present invention is carried out by adding an epoxide into the process of producing the polymethylene polyphenyl polyisocyanates at any point prior to the quench cooling step. Preferably the epoxide is added prior to the beginning of the solvent removal. The amount of epoxide added ranges from about 0.001 to about 10% by weight, preferably from about 0.01 to about 6% by weight, and more preferably from about 0.1 to about 2% by weight, based on the weight of the isocyanate.

In accordance with the present invention, suitable primary aromatic amine compounds other than aniline to be used as component (b) in the present invention include, for example, toluidine, ethylaniline, diethylaniline, etc.

Suitable solvents for the present invention include, for example, aromatic solvents such as, for example, toluene, chlorobenzene, dichlorobenzene; ethers such as, for example, glyme, diglyme, tetrahydrofuran; etc. Preferred solvents are chlorobenzene and dichlorobenzene.

Suitable epoxides for the present invention are selected from the group consisting of (i) epoxidized hydrocarbons, (ii) epoxidized ethers, (iii) epoxidized fatty acid monoglycerides, (iv) epoxidized fatty acid diglycerides, (v) epoxidized fatty acid triglycerides, (vi) epoxidized dimer fatty acids, (vii) epoxidized trimer fatty acids, and (viii) mixtures thereof.

Any chemical compound which contains the epoxide (oxirane) functionality is suitable in the preparation of the mixtures of the present invention. The term "epoxide" or "epoxy" as used herein refers to any organic compound or resin comprising at least one group comprising a three membered oxirane ring. Preferably, two or more oxirane groups are present in the epoxide compound or resin in order to obtain the polyisocyanate compositions with consistent reactivity profiles of the instant invention. The epoxide equivalent weight (EEW) range of suitable epoxides is from about 44 to 700, preferably 100 to 350 and most preferably 150 to 300. Both aliphatic mono- and polyepoxides may be used, and are well known.

It is somewhat less preferred that the epoxy contains an aromatic group due to the tendency of them to cause yellowing as well as their reduced efficacy. Examples of such aromatic group containing polyepoxides include but are not limited to those selected from the group consisting of the polyglycidyl ethers of polyhydric phenols; glycidyl esters of aromatic carboxylic acids; N-glycidylaminoaromatics such as N-glycidylaminobenzene, N,N,N',N'-tetraglycidyl-4,4'-bis-aminophenyl methane, and diglycidylaminobenzene; glycidylaminoglycidyloxy-aromatics such as glycidylaminoglycidyloxybenzene; and mixtures thereof.

The aromatic group containing polyepoxide resins, comprised of the polyglycidyl-ethers of polyhydric phenols including bis(phenol A), are also less preferred because they contain hydroxyl groups and thus, react with the polyisocyanate mixtures. Thus, this reduces the isocyanate content. Also, less preferred are aliphatic epoxides containing hydroxyl groups, e.g., glycidol, for the same reason. The preferred epoxides for use according to the invention are the aliphatic epoxides which do not contain hydroxyl groups.

Suitable for use are $C_2$–$C_{10}$ aliphatic epoxides such as, for example, ethylene oxide, propylene oxide, 1,2-butene oxide, 2,3-butene oxide (cis and/or trans), isobutylene oxide, 1,2-pentene oxide, 2,3-pentene oxide, cyclopentene oxide, 1,2-hexene oxide, cyclohexene oxide, and the like and mixtures thereof.

Examples of useful aliphatic polyepoxides include but are not limited to those selected from the group consisting of vinyl cyclohexene dioxide; butadiene dioxide; and those containing ether linkages such as triglycidyl isocyanurate, triglycidyl pentaerythritol, tetraglycidyl pentaerythritol, diglycidylethers of cylcohexane dimethanol and the diglycidylethers of other diols known to those skilled in the art, 1,4-bis(2,3-epoxypropoxy)benzene; 1,3-bis(2,3-epoxypropoxy)benzene; 4,4'-bis(2,3-epoxypropoxy) diphenyl ether; 1,8-bis(2,3-epoxypropoxy)octane; 1,4-bis(2,3-epoxypropoxy)cyclohexane; 4,4'-(2-hydroxy-3,4-epoxybutoxy)-dipgenyl dimethyl methane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxyhexane-3; 1,2,5,6-diepoxyhexane; those containing ester groups such as ERL 4221, a product of Union Carbide Corporation, illustrated in U.S. Pat. No. 4,814,103, the disclosure of which is herein incorporated by reference, and mixtures thereof.

Other useful epoxides are listed in, for example, U.S. Pat. No. 3,298,998, the disclosure of which is herein incorporated by reference. These compounds include but are not limited to those selected from the group consisting of bis[p-(2,3-epoxypropoxy)phenyl]cyclohexane; 2,2bis[p-(2,3-epoxypropoxy)phenyl]norcamphane; 5,5-bis[(2,3-epoxypropoxy)phenyl]hexahydro-4,6-methanoindane; 2,2- bis[4-(2,3-epoxypropoxy)-3-methylphenyl]hexahydro-4,7-methanoindane; and 2-bis[p-2,3-epoxypropoxy)phenyl]-methylene-3-methylnorcamphane; and mixtures thereof. Other usable epoxides are found in, for example, Handbook of Epoxy Resin, Lee and Neville, McGraw-Hill, New York (1967) and U.S. Pat. No. 3,018,262, both of which are herein incorporated by reference.

Also, suitable epoxides for use in the present invention include the epoxidized dimer and trimer fatty acids, which are formed by epoxidizing the products of the polymerization of $C_{18}$ unsaturated fatty acids such as oleic acid, linoleic acid, linolenic acid, elaidic acid and the like. The use of a dimer or trimer fatty acid entity furnishes a higher molecular weight epoxide that is less likely to volatilize from the finished articles that the polyisocyanate compositions of the present invention are used to produce. The dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, mono-unsaturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples of the present invention.

Epoxide A: a polyepoxide based upon linseed oil, with an epoxide equivalent weight of about 180; commercially available as Epoxol 95 from Unitech Chemical, Inc.

Epoxide B: an aliphatic epoxide having 3 carbon atoms, having an epoxide equivalent weight of about 74; commercially available as glycidol from Aldrich Chemical Co.

Epoxide C: an aliphatic epoxide having 8 carbon atoms, and having an epoxide equivalent weight of about 128; commercially available as epoxyoctane from Aldrich Chemical Co.

The following steps were followed in phosgenation of MDA to PMDI in the working examples. These steps are labeled A through G to identify the point of addition of the epoxide component to the process as set forth in Table 1. Epoxide addition occurred at the beginning of the specified step, unless stated otherwise.

A) 100 Grams of MDA was dissolved in 500 ml chlorobenzene. This solution of MDI was added to a chlorobenzene/phosgene solution at 0° C. while maintaining a small flow of phosgene into the solution.

B) The resultant slurry was slowly heated to 128° C. and held there for 10 minutes.

C) The flow of phosgene was turned off.

D) The solution was purged with nitrogen for 10 minutes.

E) The chlorobenzene was distilled off at atmospheric pressure until a pot temperature of 140° C., then cooled to 25° C.

F) The crude isocyanate mixture was placed under a vacuum (4–5 mm Hg) and heated to 60° C. to remove any residual solvent.

G) The PMDI is quickly heated under a vacuum until reaching a head temperature of 208° C.

TABLE 1

Addition of Epoxides to Polymeric MDI Process

| Example | Epoxide | % by Wt. of Epoxide | Addition Point | 430 nm | 520 nm | % Reduction 430 nm | % Reduction 520 nm |
|---|---|---|---|---|---|---|---|
| 1 | A | 1.58% | D* | 0.105 | 0.025 | 65.0% | 79.8% |
| 2 | A | 1.58% | E** | 0.176 | 0.038 | 41.3% | 69.4% |
| 3 | B | 0.64% | E** | 0.132 | 0.029 | 56.0% | 76.6% |
| 4 | B | 0.63% | D* | 0.126 | 0.028 | 58.0% | 77.4% |
| 5 | C | 1.19% | D* | 0.120 | 0.033 | 60.0% | 73.4% |
| 6 | A | 4.75% | E** | 0.124 | 0.023 | 58.7% | 81.5% |
| 7 | A | 1.58% | E** | 0.153 | 0.032 | 49.0% | 74.2% |
| 8 | None | 0.000 | — | 0.300 | 0.124 | — | — |

D* added 2 minutes into D
E** added at 135° C., then allowed to increase to 140° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polymethylene poly(phenylisocyanates) comprising
   (1) condensing
      (a) formaldehyde with
      (b) aniline or other primary aromatic amines, to yield methylene-bridged polyphenyl polyamines;
   (2) reacting
      (c) the methylene-bridged polyphenyl polyamines, with
      (d) an excess of phosgene, in the presence of a solvent at an elevated temperature to yield the corresponding methylene-bridged polyphenyl polyisocyanates;

(3) removing the solvent from the methylene-bridged polyphenyl polyisocyanates;

(4) heating the crude polyisocyanate under vacuum to remove residual solvent and reduce by-products; and (5) quench cooling the polyisocyanate to a temperature of less than 80° C.;

the improvement wherein (e) from about 0.001 to about 10% by weight, based on the weight of isocyanate, of an epoxide selected from the group consisting of (i) epoxidized hydrocarbons, (ii) epoxidized ethers, (iii) epoxidized fatty acid monoglycerides, (iv) epoxidized fatty acid diglycerides, (v) epoxidized fatty acid triglycerides, (vi) epoxidized dimer fatty acids, (vii) epoxidized trimer fatty acids and (viii) mixtures thereof, is added to the process prior to step (5), thereby producing methylene-bridged polyphenyl polyisocyanates characterized by improved color.

2. The process of claim 1, wherein (e) from about 0.01 to 6% by weight, based on the weight of the isocyanate, of an epoxide selected from the group consisting of (i) epoxidized hydrocarbons, (ii) epoxidized ethers, (iii) epoxidized fatty acid monoglycerides, (iv) epoxidized fatty acid diglycerides, (v) epoxidized fatty acid triglycerides, (vi) epoxidized dimer fatty acids, (vii) epoxidized trimer fatty acids and (viii) mixtures thereof, is added to the process prior to step (5), thereby producing methylene-bridged polyphenyl polyisocyanates characterized by improved color.

3. The process of claim 2, wherein (e) from about 0.1 to 2% by weight, based on the weight of the isocyanate, of an epoxide selected from the group consisting of (i) epoxidized hydrocarbons, (ii) epoxidized ethers, (iii) epoxidized fatty acid monoglycerides, (iv) epoxidized fatty acid diglycerides, (v) epoxidized fatty acid triglycerides, (vi) epoxidized dimer fatty acids, (vii) epoxidized trimer fatty acids and (viii) mixtures thereof, is added to the process prior to step (5), thereby producing methylene-bridged polyphenyl polyisocyanates characterized by improved color.

4. The process of claim 1, wherein (b) primary aromatic amines are selected from the group consisting of toluidine, ethylaniline, diethylaniline, and mixtures thereof.

5. The process of claim 1, wherein the solvent comprises one or more compounds selected from the group consisting of toluene, chlorobenzene, dichlorobenzene, glyme, diglyme and tetrahydrofuran.

6. The process of claim 1, wherein said epoxides have an epoxide equivalent weight of from 44 to 700.

7. The process of claim 6, wherein said epoxides have an epoxide equivalent weight of from 100 to 350.

8. The process of claim 6, wherein said epoxides have an epoxide equivalent weight of from 150 to 300.

9. The process of claim 1, wherein said epoxide contains two or more oxirane groups.

10. The process of claim 1, wherein said epoxide comprises glycidol or epoxyoctane.

11. The process of claim 1, wherein said epoxide comprises epoxidized linseed oil.

12. The polymethylene poly(phenylisocyanate) composition produced by the process of claim 1.

* * * * *